(No Model.)
J. P. KNISLEY.
HITCHING DEVICE.
No. 430,962. Patented June 24, 1890.
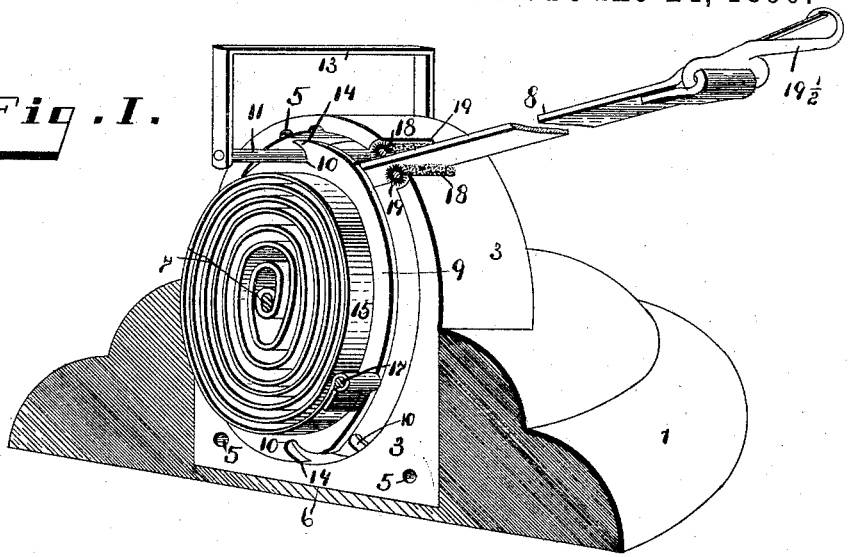
Fig. I.
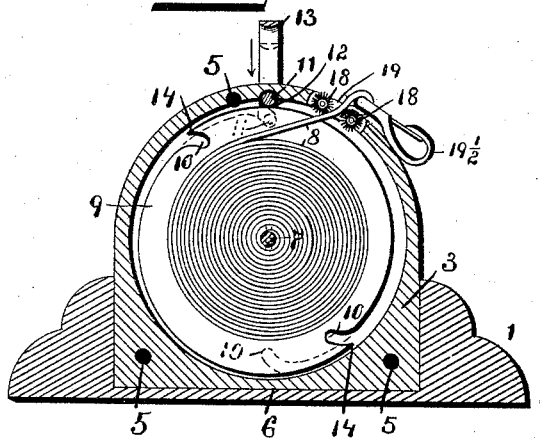
Fig. II.
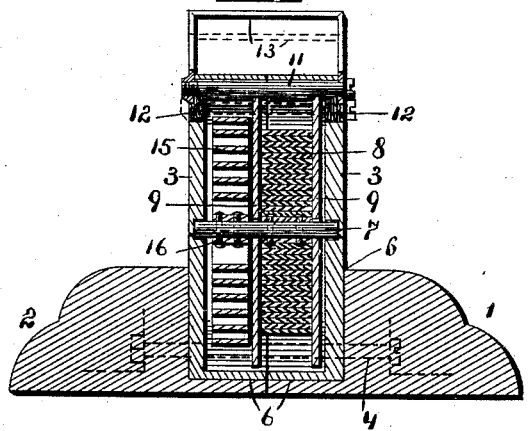
Fig. III.
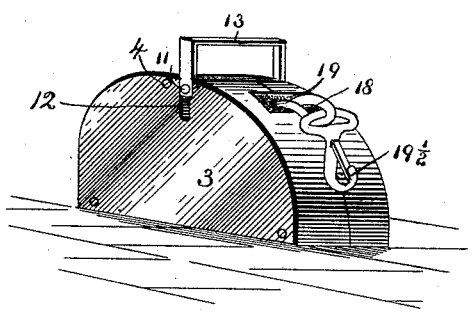
Fig. IV.
Witnesses:
F. G. Fischer
E. Arthur
Inventor:
J. P. Knisley
By Knight Bros.
Attys.

UNITED STATES PATENT OFFICE.

JAMES P. KNISLEY, OF ADRIAN, MISSOURI.

HITCHING DEVICE.

SPECIFICATION forming part of Letters Patent No. 430,962, dated June 24, 1890.

Application filed December 12, 1889. Serial No. 333,440. (No model.)

*To all whom it may concern:*

Be it known that I, JAMES P. KNISLEY, of Adrian, in the county of Bates and State of Missouri, have invented certain new and useful Improvements in Hitching Devices, of which the following is a full, clear, and exact description, reference being had to the accompanying drawings, forming a part of this specification.

My invention relates to those hitching devices having straps automatically rolled up out of the way; and my invention consists in features of novelty hereinafter described, and pointed out in the claims.

Figure I is a vertical section of my device, showing the spring by which the reel is actuated. Fig. II is a vertical section showing the strap wound upon the reel. Fig. III is a vertical transverse section showing the relative positions of the strap and spring. Fig. IV is an enlarged perspective view.

Referring to the drawings, 1 2 represent the two-part base which corresponds with the ordinary hitching-weight. This may be made of metal or other material having sufficient weight to hold an animal. The base is made in two parts, (see Fig. III,) which are secured to each other and to a frame 3 by means of bolts 4, which extend through the sections of the base and the frame 3 through the holes 5. The frame 3 rests in a mortise 6 in the base.

7 represents a reel journaled in the frame 3, to which is secured one end of a strap or chain 8, the frame 3 being made in two sections, in order that the reel may be inserted therein.

9 represents the circular sides or flanges of the reel, said sides being provided with recesses 10 on their periphery.

11 represents a stop or cross pin, which has bearing in slots 12 near the upper side of the frame 3.

13 represents a handle secured to the cross-pin 11, which, when taken hold of to lift the frame, will first raise the cross-pin 11 to the position shown in Figs. II and III. When the handle is released, the cross-pin will of course fall to the lower end of the slots 12, and in so doing it passes into the recesses 10 in the sides of the reel, (see Fig. I,) the sides of the reel being at this point of slightly-less diameter, so that hooked portions 14 are formed thereon, said hooked portions coming in contact with the cross-pin and holding the same in the recesses until the cross-pin has been withdrawn therefrom by raising the handle 13.

15 represents a coil-spring secured at its inner end to the reel at a point 16, and secured at its outer end to the inner side of the frame 3 by a screw 17.

18 represents two rotary brushes secured in an opening 19 in the frame, through which the strap 8 protrudes. The brushes serve to clean the dirt from the strap when the same is being wound up.

19½ represents a snap on the outer end of the strap which may be hooked to the bridle or halter of a horse or other animal.

While I have shown my frame attached to the usual weight by which horses are tied on the streets, I do not confine myself to the same, as the frame may be readily set into a mortise in a stationary block of stone, post, or other object, or may be secured to any object by means of bolts or other fastenings.

The operation is as follows: When it is desired to secure the horse or other animal, I pick up the device (if the same is connected with the ordinary base) by the handle 13, remove it from the vehicle, and deposit it on the ground or sidewalk. I then withdraw the strap, as shown in Fig. I, rotating the reel and compressing the spring 15, the base being of sufficient weight to remain on the ground. After sufficient length of the strap has been withdrawn I cease pulling on the same, at which time the spring 15 will rotate the reel in the opposite direction until the cross-pin 11 comes in contact with the hooked portions 14, and thus stop the rotation of the reel. When I desire to wind up the strap, I disconnect the same from the animal and take hold of the handle 13, in order to place the device back in the vehicle, by which action the cross-pin 11 is raised out of contact with the reel, and the spring 15 is permitted to rotate the reel and wind up the strap. Of course where the device is secured to a stationary object it will operate equally as well as if it were attached to a movable weight.

I claim as my invention—

1. The combination of a base, a frame having a strap-opening and slots, a reel journaled in the frame, having recessed flanges forming hooked projections, automatic winding mechanism for the reel, a strap secured to the reel, and a cross-pin extending through the slots, provided with a lifting-handle, the cross-pin engaging the projections when in normal position and released from the latter when lifted by the handle, substantially as described.

2. The combination of a base, a frame having a strap-opening, a reel journaled in the frame, automatic winding mechanism for the reel, a strap secured to the reel, and rotary brushes journaled in the frame at the strap-opening, substantially as described.

JAMES P. KNISLEY.

Witnesses:
C. L. MILLS,
J. SCUDDER.